US012668996B2

(12) United States Patent
Pfeuti et al.

(10) Patent No.: US 12,668,996 B2
(45) Date of Patent: Jun. 30, 2026

(54) LOCKING DEVICE FOR A DOOR

(71) Applicant: Gilgen Door Systems AG, Schwarzenburg (CH)

(72) Inventors: Andreas Pfeuti, Riffenmatt (CH); Yanick Bapst, Rechthalten (CH); Beat Dütsch, Zollikofen (CH)

(73) Assignee: Gilgen Door Systems AG, Schwarzenburg (CH)

( * ) Notice: Subject to any disclaimer, the term of this patent is extended or adjusted under 35 U.S.C. 154(b) by 0 days.

(21) Appl. No.: 18/719,931

(22) PCT Filed: Dec. 8, 2022

(86) PCT No.: PCT/EP2022/084903
§ 371 (c)(1),
(2) Date: Jun. 14, 2024

(87) PCT Pub. No.: WO2023/110602
PCT Pub. Date: Jun. 22, 2023

(65) Prior Publication Data

US 2025/0043596 A1 Feb. 6, 2025

(30) Foreign Application Priority Data

Dec. 15, 2021 (CH) ................................ 70724/2021

(51) Int. Cl.
*E05B 65/08* (2006.01)
*E05B 47/00* (2006.01)
(Continued)

(52) U.S. Cl.
CPC ...... *E05B 65/0817* (2013.01); *E05B 47/0003* (2013.01); *E05B 53/005* (2013.01); *E05C 5/00* (2013.01); *E05C 7/04* (2013.01)

(58) Field of Classification Search
CPC ............ E05B 47/0001; E05B 47/0003; E05B 47/0004; E05B 2047/0016;
(Continued)

(56) References Cited

U.S. PATENT DOCUMENTS

| | | | | |
|---|---|---|---|---|
| 4,702,095 | A * | 10/1987 | Ben-Asher | E05B 47/023 292/201 |
| 2021/0156181 | A1 * | 5/2021 | Welbig | E05B 65/08 |
| 2024/0240498 | A1 * | 7/2024 | Vonaesch | E05B 65/0835 |

FOREIGN PATENT DOCUMENTS

| | | |
|---|---|---|
| CN | 102127994 A | 7/2011 |
| CN | 211691917 U | 10/2020 |

(Continued)

OTHER PUBLICATIONS

International Search Report for PCT/EP2022/084903 dated Mar. 16, 2023.

*Primary Examiner* — Christine M Mills
*Assistant Examiner* — Yahya Sidky
(74) *Attorney, Agent, or Firm* — Sughrue Mion, PLLC

(57) ABSTRACT

The invention relates to a locking device (1) for a door, in particular for a sliding door (10), comprising at least one door leaf (11). The locking device has a housing part (2) and a locking element (5) which is held by the housing part (2) and which is used to lock and unlock the at least one door leaf (11) in a closed or open position. The locking element (5) can be slid along a sliding direction (V) and can be tilted about a rotational axis (R1) relative to the housing part (2) in order to allow the at least one door leaf (11) to be locked and unlocked alternatively by both sliding as well as by tilting the locking element (5). The invention additionally relates to a door, in particular a sliding door (10), comprising such a locking device (1).

21 Claims, 9 Drawing Sheets

(51) Int. Cl.
*E05B 53/00* (2006.01)
*E05C 5/00* (2006.01)
*E05C 7/04* (2006.01)

(58) Field of Classification Search
CPC ..... E05B 2047/0037; E05B 2047/0073; E05B 2047/0074; E05B 53/003; E05B 53/005; E05B 65/08; E05B 65/0811; E05B 65/0817; E05B 65/0823; E05B 65/0829; E05B 65/087; E05B 65/0876; E05B 65/0882
See application file for complete search history.

(56) References Cited

FOREIGN PATENT DOCUMENTS

| | | | | | |
|---|---|---|---|---|---|
| DE | 198 35 678 A1 | | 3/2000 | | |
| EP | 2 514 891 A1 | | 10/2012 | | |
| FR | 2 919 885 A1 | | 2/2009 | | |
| KR | 102037986 B1 | * | 10/2019 | ............. | E05C 17/62 |

* cited by examiner

LOCKING DEVICE FOR A DOOR

CROSS REFERENCE TO RELATED APPLICATIONS

This application is a National Stage of International Application No. PCT/EP2022/084903 filed Dec. 8, 2022, claiming priority based on Swiss Patent Application No. 070724/2021 filed Dec. 15, 2021.

TECHNICAL FIELD

The present invention relates to a locking device for a door, in particular for a sliding door, comprising at least one door leaf to be locked or released. The invention also relates to a door having a locking device of this kind.

PRIOR ART

Sliding doors with at least one, often two, movable door leafs have long been known in the art. The door leaf or door leafs can usually be moved perpendicularly to a passage direction, in such a manner that a passage through a wall opening of a building, for example, can be opened or closed. Automatic sliding doors, in particular, are also known in the art, in which the door leaf, or door leafs, has/have to be moved not by hand for opening and closing, but this is accomplished by a drive motor. A presence sensor may be provided on either side of the sliding door, in order to initiate automatic opening of the sliding door as soon as a person approaches.

In many sliding doors used nowadays, it is desirable for the door to be lockable in a closed position, so that unauthorized access at certain times, for example, is prevented. For this purpose, corresponding locking devices are provided, which have the most varied embodiments in the prior art.

For example, CN 102127994 A discloses a locking device comprising a locking lever provided with hook-shaped ends that can be tilted for unlocking. The tilting can be effected automatically by means of an electromagnet, on the one hand, and manually by means of a cable, on the other.

The locking device disclosed in CN 211691917 U has an electromagnet with which a locking element can be lowered towards the door leafs for locking or raised for unlocking. Manual unlocking is possible with the help of an unlocking bolt, which lifts the locking element.

FR 2 919 885 A1 discloses a locking device comprising an electromagnet, with which a locking element can be moved against a spring force towards the door leafs to effect locking. Movement enables a metal disc to come into contact with a suction cup, as a result of which the lock is maintained even after the electromagnet has been switched off. In the event of a power failure, the lock can be manually released by means of a cable attached to the locking element.

DE 198 35 678 A1 discloses an electrical locking device for sliding door leafs, in which a locking element can be tilted between an open and a closed position. This can be achieved for manual unlocking by rotating an actuating knob attached to the locking element via an axis. Alternatively, unlocking and locking can also be performed by means of an electromagnet, which also causes a rotation of the locking bolt.

A disadvantage of the locking devices in the aforementioned documents is that the locking element remains in the position it has just adopted in the event of a power failure. This can be devastating in the event of a power failure caused by a fire, for example, as the door must then be locked to prevent the spread of fire, for example, or automatically opened to allow passage for fleeing individuals, depending on the circumstances. However, automatic opening or closing of the door with the help of a motorized door drive or a purely mechanical, for example spring-operated, emergency drive can only take place if enabled by the locking device.

Moreover, the aforementioned locking devices have the disadvantage that in the event of a malfunction, in particular jamming, of the electrical part or the manual part, the other part in each case is also thereby blocked. This may result in a situation in which the door can no longer be opened, even in an emergency.

Moreover, many locking devices in the prior art are relatively complicated in design and consist of a large number of components, which not only makes manufacturing, but also retrofitting or subsequent replacement, complex.

SUMMARY OF THE INVENTION

An object of the present invention is to specify a locking device for a door that is easy to manufacture and flexible to use. The locking device should preferably allow both automatic and manual locking and unlocking and, in addition, it should advantageously be able to assume a predefined state in the event of a power failure.

In order to achieve this object, the present invention provides a locking device for a door, in particular for a sliding door, with at least one door leaf, comprising

- a housing part,
- a locking element held by the housing part, which serves to lock and unlock the at least one door leaf in a closed or open position.

The locking element can be both slid relative to the housing part along a sliding direction and tilted about a rotational axis to allow locking and unlocking of the at least one door leaf alternatively, both by means of sliding and also by means of tilting of the locking element.

With the proposed locking device, there are therefore at least two alternative ways of locking and unlocking the door leaf or door leafs. On the one hand, the locking element can be slid along the sliding direction and, on the other hand, it can be tilted about the rotational axis. This means that the locking device can be produced particularly easily and yet very flexibly. In particular, sliding and tilting of the locking element can be provided for different purposes of locking and unlocking. For example, automatic, i.e. electro-technical, pneumatic, or hydraulically-based, locking and unlocking can cause the locking element to slide, and a manual mechanism for manual locking and unlocking can tilt the locking element—or vice versa. This makes it particularly easy to design the locking device in such a manner that it assumes a predetermined state, in particular a locking or releasing state, in the event of an unexpected power failure. For example, spring elements and/or holding elements, such as end position magnets, for example, can be provided to move the locking element into the desired predetermined position, or to hold it in the already assumed position, in the event of a power failure.

Due to the two degrees of freedom of the locking element, i.e. sliding and tilting, it is also possible, for example, to uncouple automatic, i.e. electro-technically-based, locking and unlocking from manual locking and unlocking. A malfunction, such as a jamming of one part (drive or manual mechanism), for example, does not necessarily lead to blocking of the other part.

Locking and unlocking is preferably possible both by purely sliding the locking element, on the one hand, and by purely tilting the locking element, on the other.

The rotational axis about which the locking element can be tilted preferably extends parallel to the sliding direction and advantageously through the housing part. The rotational axis is particularly preferably defined by a rod-shaped element about which the locking element can be tilted, i.e. rotated. The rod-shaped element is preferably a push rod which is displaceable along its longitudinal direction, so that it thereby slides the locking element along the sliding direction. This makes the manufacture of the locking device particularly simple.

The door is preferably a sliding door, wherein the locking element even more preferably serves to fixedly connect two door leafs of the sliding door to one another for locking. For this purpose, the locking element preferably has a clip-shaped, in particular C-shaped, element that forms a stop for a stop element attached to the respective door leaf in the locked state. This means that the stop elements of the two door leafs are preferably each arranged within the clip-shaped element along the opening direction of the sliding door leafs in the locked state and are thereby prevented from being moved away from one another. This means that the two door leafs cannot then be moved away from one another, i.e. the sliding door is locked.

The stop elements of the two door leafs can, for example, be elements that project upwardly or in the passage direction, such as hooks, bolts, pins or blocks, which preferably each have a stop surface facing in the opening direction that is used for butting against the locking element in the locked state.

Of course, the locking device can also be used to lock a sliding door with only one door leaf. The locking device, which is preferably stationary in other embodiments too, can then form a stop for the only one door leaf in the locked state, in order to prevent it from being moved.

In the case of a sliding door with two door leafs, the locking element preferably forms two or more stops, in particular precisely two stops, which serve to prevent movement of the door leafs in the locked state. In the case of a sliding door with only one door leaf, the locking element preferably forms one or more stops of this kind, in particular exactly one stop of this kind.

However, the door does not necessarily have to be a sliding door, although this is preferred. The specified locking device can therefore also be used, for example, with hinged doors or swing doors. In the event that the door is a sliding door, the at least one door leaf can preferably be slid perpendicularly to the door passage direction, i.e. along the wall forming the door opening, in order to close or open up the door opening.

The locking element preferably serves to lock and unlock the at least one door leaf in a closed position. This means that the locking element preferably serves to prevent opening of the at least one door leaf in the locked state for the purpose of releasing the door opening. However, in certain embodiments, it would also be conceivable in practice for the locking element to be used to lock and unlock the at least one door leaf in an open position. In this case, the locking element would prevent a closing of the at least one door leaf in the locked state.

The sliding direction, along which the locking element is movable back and forth relative to the preferably stationary housing part, preferably extends parallel to the direction of passage of the door. Furthermore, the sliding direction advantageously extends perpendicular to the direction along which the at least one door leaf is slidable for closing or opening up the door opening.

In a preferred embodiment, the locking device also comprises a torsion spring that applies a torsional force to the locking element about the rotational axis, in order to maintain the locking element in a state locking or releasing the at least one door leaf. The torsional force exerted by the torsion spring is particularly preferably used for maintaining and/or bringing the locking element into the locking state. In this case, the locking element can therefore be tilted and brought into the releasing state by overcoming the torsional force.

In a preferred embodiment, the locking device also includes a compression spring that applies a compressive force to the locking element to hold it in a state locking or releasing the at least one door leaf and/or to bring the locking element into one of these states. The locking element is therefore preferably subjected to a corresponding compressive force by the compression spring. The compression spring is preferably used to slide the locking element along the sliding direction and/or to hold it in its position along the sliding direction. The compression spring in this case can be used to safeguard the predetermined state of the locking device and, in particular, of the locking element in the event of an unexpected power failure.

In a particularly preferred embodiment, the locking device comprises a combined compression and torsion spring that applies both a compressive force and a torsional force to the locking element, in order to hold it in a state locking or releasing the at least one door leaf. The combined compression and torsion spring which can, in particular, be designed as a coil spring, therefore advantageously performs the function of both the compression spring indicated above and the torsion spring indicated above.

It is preferable for the locking element to be tiltable about the rotational axis against the torsional force exerted by the combined compression and torsion spring on the unlocking element for unlocking the at least one door leaf. The torsional force exerted by the combined compression and torsion spring preferably keeps the locking element in a locking state.

Furthermore, it is preferable for the locking element to be slidable along the sliding direction, in order to unlock the at least one door leaf against the compressive force exerted by the combined compression and torsion spring.

Depending on the embodiment, it may be preferable for the locking device to be designed to maintain the previously assumed state regarding unlocking or locking in the event of a power failure or, however, to assume a predetermined state. In the event that the previously assumed state is to be maintained, one or more holding elements are preferably provided, such as one or more end position magnets, which keep the locking element in the sliding position that has just been assumed in each case, even in the event of a power failure. The end position magnet or end position magnets may, in particular, each be permanent magnets.

The compressive force exerted by the compression spring, in particular the combined compression and torsion spring, can be used to hold the locking element in a locking state and/or to bring it into a locking state in the event of a power failure. As a result of this, in the event of a power failure, the locking element can automatically assume the locking state due to the spring force.

In other embodiments, it may also be preferable, however, for the locking element to be slidable along the sliding direction, in order to lock the at least one door leaf against the compressive force exerted by the combined compression and torsion spring. The compressive force exerted by the compression spring, in particular by the combined compression and torsion spring, can be used to hold the locking element in a releasing state and/or to bring it into a locking state in the event of a power failure. As a result of this, in the event of a power failure, the locking element can automatically assume the releasing state due to the spring force.

In order to slide the locking element against the compressive force of a compression spring, in particular a compression and torsion spring, the locking device also preferably comprises a sliding device. The sliding device is preferably an electromagnetic sliding device. The sliding device may, in particular, include a solenoid. With the help of a solenoid, the sliding of the locking element can be achieved in a particularly simple manner. Rather than a solenoid, the use of another electromagnetic element is also conceivable.

The sliding device can preferably be activated in such a manner that it brings the locking device into a releasing and/or locking state. In the case of an electromagnetic sliding device, this is preferably activated in such a manner that live wires and, in particular, wire coils, for example, of a magnet and, in particular, of a solenoid, are energized. In order to change the state of the sliding device from "releasing" to "locking", or vice versa, a current can therefore be momentarily applied to the electromagnetic sliding device, in particular to the solenoid. In order to move the sliding device in the opposite direction, depending on the embodiment, for example, the restoring force of a spring can be utilized and/or the current can be applied to the sliding device with a reverse voltage. The electromagnetic sliding device may have one or more holding elements, preferably one or more end position magnets, to keep the sliding device in position, even when it is not activated. Alternatively, the holding elements could, for example, also be one or more suction cups.

In other embodiments, the sliding device may have an activated state, in which the sliding device holds the locking element in a releasing state. In the case of an electromagnetic sliding device, the activated state is preferably achieved by passing a current through live wires and, in particular, wire coils, for example of a magnet and, in particular, of a solenoid. In the event of a power failure, the locking element is then preferably moved due to the compressive force exerted by a compression spring, into a position in which the locking element locks the at least one door leaf.

In yet other embodiments, the sliding device may, however, also have an activated state in which it holds the locking element in a locking state. In the case of an electromagnetic sliding device, the activated state is also preferably adopted by passing a current through live wires and wire coils, in particular, for example of a magnet and, in particular, a solenoid. In the event of a power failure, the locking element is then preferably moved due to the compressive force exerted by a compression spring into a position in which the locking element releases the at least one door leaf.

In order to tilt the locking element against the torsional force of a torsion spring, in particular a compression and torsion spring, the locking device further preferably comprises a tilting device. The tilting device is preferably a purely mechanical tilting device, i.e. a device designed for tilting the locking element by means of purely mechanical actuation. The tilting device is preferably a device to be actuated manually by a user, which therefore allows the user to manually lock or release the door manually.

The tilting device advantageously includes an actuating element that can be moved by a user in such a manner that it tilts the locking element to unlock or lock the at least one door leaf. The actuating element is advantageously acted upon by at least one spring element in the direction of a standard position with a spring force.

The actuating element is preferably pivotable about a second rotational axis that extends perpendicular to the first rotational axis, about which the locking element can be tilted. Particularly preferably, the second rotational axis is defined by a rod-shaped element about which the actuating element is pivotable, i.e. rotatable.

It is possible in principle for the locking element to be either slid automatically by means of the sliding device and manually tilted by a user or for the locking element to be automatically tiltable by means of the tilting device and slid manually by a user. In this case, automatic movement or tilting means that the locking element is moved or tilted with the help of a technical means, such as a solenoid or a hydraulic drive, for example. This is in contrast with manual movement or tilting, in which the locking element is moved or tilted by means of muscle force, wherein this can be assisted by spring force, for example.

In order to manually tilt or slide the locking element, at least one Bowden cable is preferably provided.

The locking element preferably has one or more engaging elements, in particular one or more engaging pins, each of which extends parallel to the sliding direction, and which serve to engage one or more locking hooks attached to the door leaf(s) when locking. The locking hook(s) is/are preferably designed to engage the locking element in a direction perpendicular to the sliding direction. Depending on the embodiment, the engaging pin(s) may be detachably attached to the remaining part of the locking element or integrally formed therewith.

The locking hook(s) preferably each has/have an inclined surface that serves to abut against the locking element during the closing or opening of the respective door leaf, in such a manner that it is tilted. Preferably, the one or more inclined surface(s) abut(s) against the locking element during the closing (or opening) of the door, thereby tilting it. However, as soon as the door is fully closed (or opened), the locking element advantageously pivots back again, for example due to spring force, so that the locking hooks are engaged with it.

The engaging element(s) may preferably be optionally arranged on the locking element in such a manner that they extend outwards from either the front or the back of the locking element with respect to the sliding direction. This kind of optionally possible arrangement of the engaging element(s) on the locking element offers the advantage that the locking device can be very easily adapted in terms of its function in the event of a power failure. Depending on whether the engaging element(s) extend(s) in one direction or the other, the locking device can default to a locking or releasing state in the event of a power failure. For this purpose, one or more drill holes are preferably provided in the locking element, into which the engaging element(s) can be screwed from both sides. The locking element is preferably configured in a plate-shape overall.

The locking device preferably has a compact design as a whole. At least the locking element and, if present, the sliding device and/or the tilting device are advantageously fastened in or on the housing part, so that the locking device can preferably be attached exclusively by means of fastening the housing part to the door. In particular, the locking device as a whole may have a substantially cuboid or cube-like configuration, meaning that the housing part, the locking element and, if present, the sliding device and/or the tilting device together define the approximate shape of a cuboid or a cube with their respective outer surfaces or edges.

The present invention also relates to a door, in particular a sliding door, with at least one door leaf and a locking device, as described above, to lock the at least one door leaf in a closed or open position.

BRIEF DESCRIPTION OF THE DRAWINGS

Preferred embodiments of the invention are described in the following with reference to the drawings, which are solely for the purpose of illustrating the present preferred embodiments of the invention and not for the purpose of limiting the same. In the drawings.

DESCRIPTION OF PREFERRED EMBODIMENTS

Figure 12:
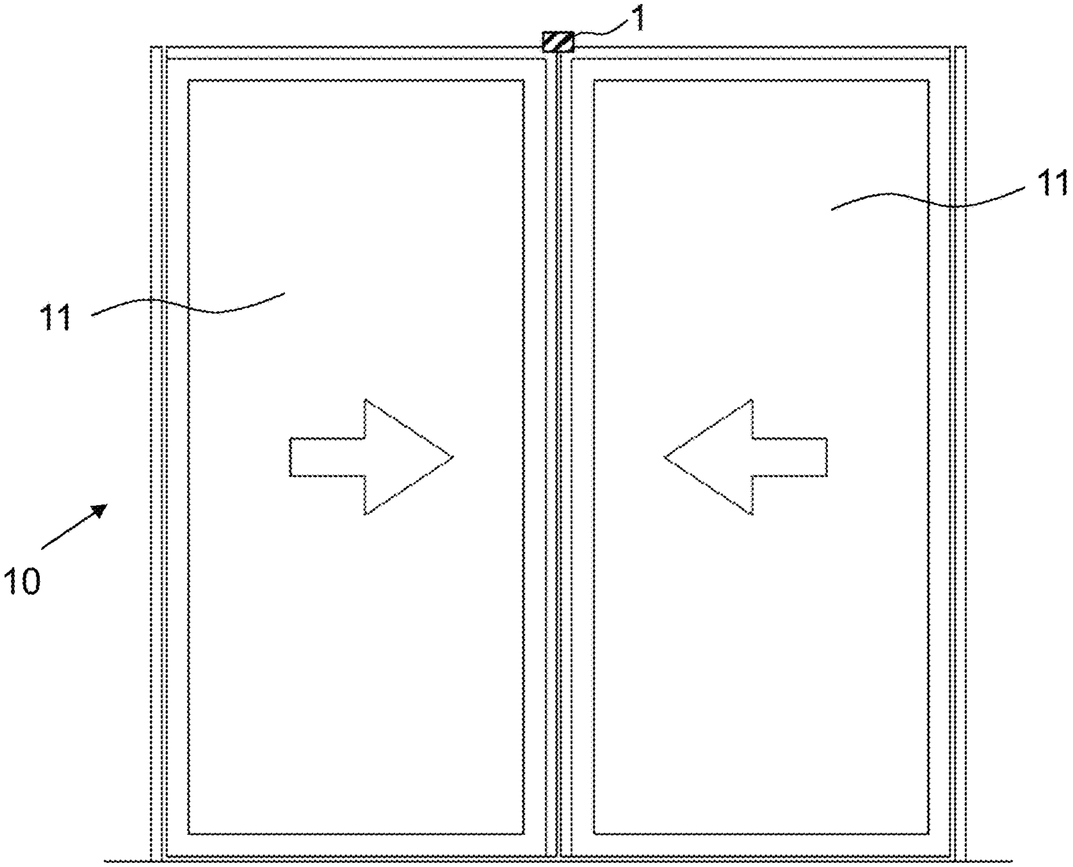
FIG. 12 shows a schematic view of a sliding door with the locking device in FIG. 1 from the front.
Figure 13:
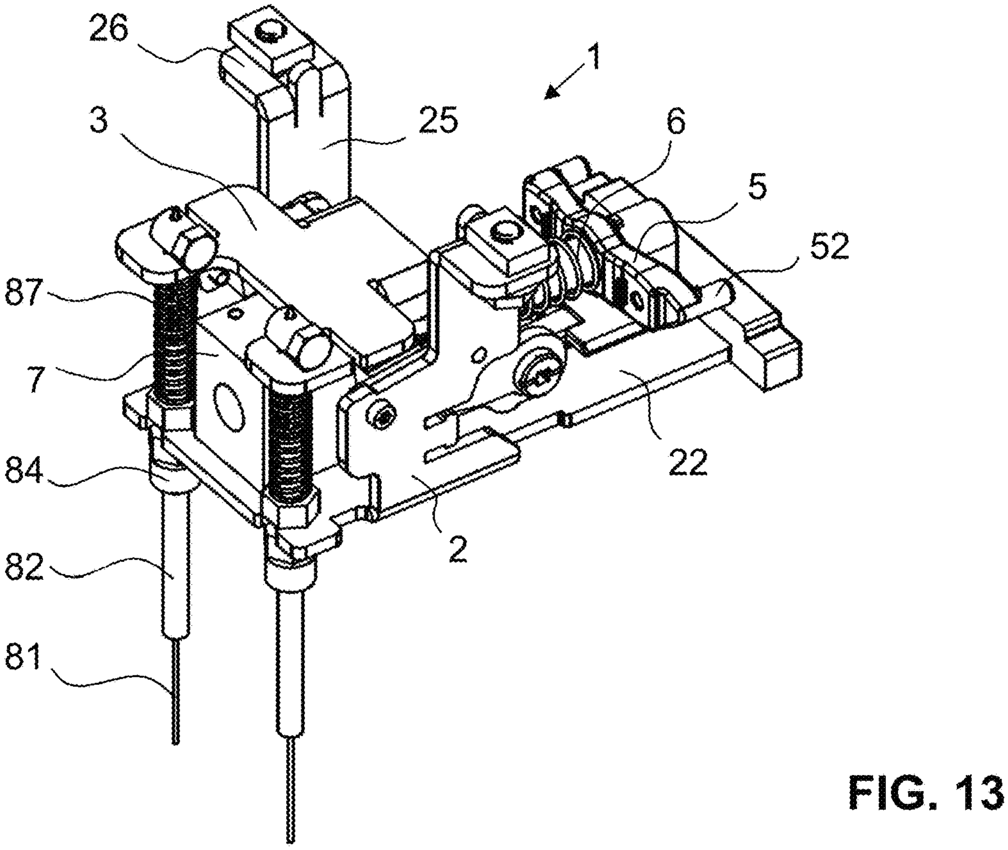
FIG. 13 shows a perspective view of an inventive locking device according to another embodiment from diagonally behind above.
Figure 14:
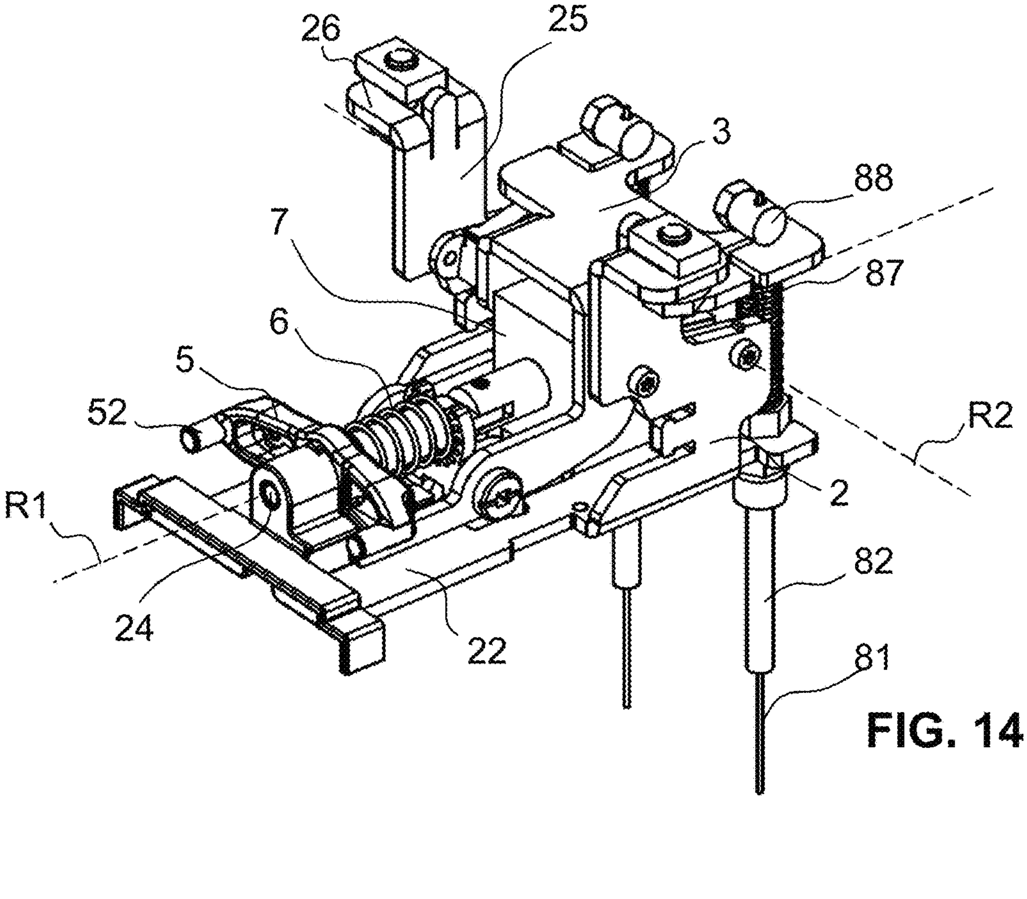
FIG. 14 shows a perspective view of the locking device in FIG. 13 from diagonally in front above.

In FIGS. 1 to 11*c*, an embodiment of a locking device 1 is shown in various views and states. FIG. 12 depicts a sliding door with such a locking device of this kind. FIGS. 13 and 14 show another, different embodiment of a similarly inventive locking device 1. Elements that appear identical or have a similar action and occur twice or multiple times are each labeled with the same reference signs below.

In the following, location and direction indications such as above, below, vertical, horizontal, upwards, downwards, etc., each refer to the locking device, which is mounted in its intended manner on a door, in particular on a sliding door. The suspension arrangement is then typically arranged above the door leaf or leafs in relation to the direction of gravity and is usually mounted on a wall or a stationary part of the door.

Location and direction indications such as front, forwards, rear, and backwards each refer in this case to the locking device which is mounted in its intended manner, wherein the elements of the locking device that are arranged closest to the wall are at the front and the elements of the locking device spaced furthest from the wall are at the back.

Figure 1:
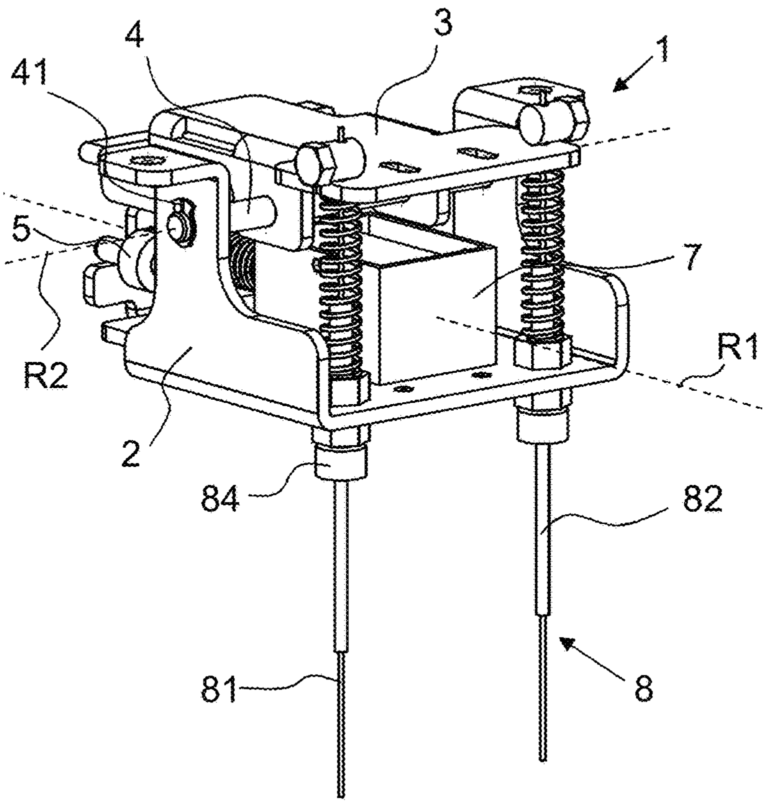
FIG. 1 shows a perspective view of a locking device according to the invention from diagonally behind above.
Figure 2:
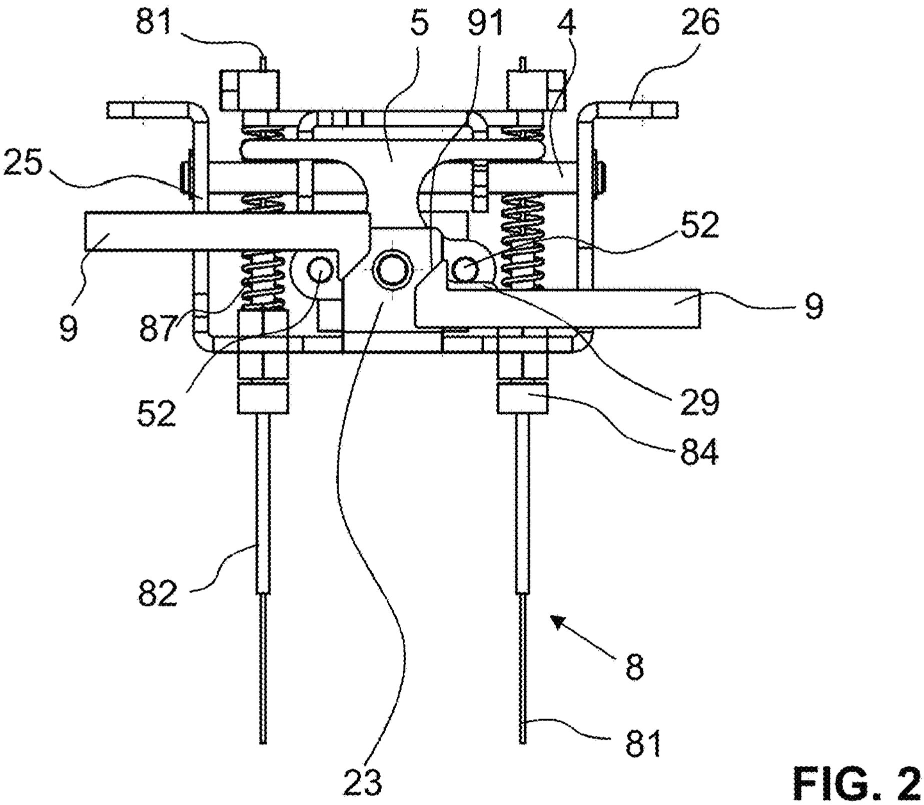
FIG. 2 shows a plan view of the locking device in FIG. 1 from the front, in the locking state, i.e. with locking hooks attached to each door leaf engaged therein.
Figure 3:
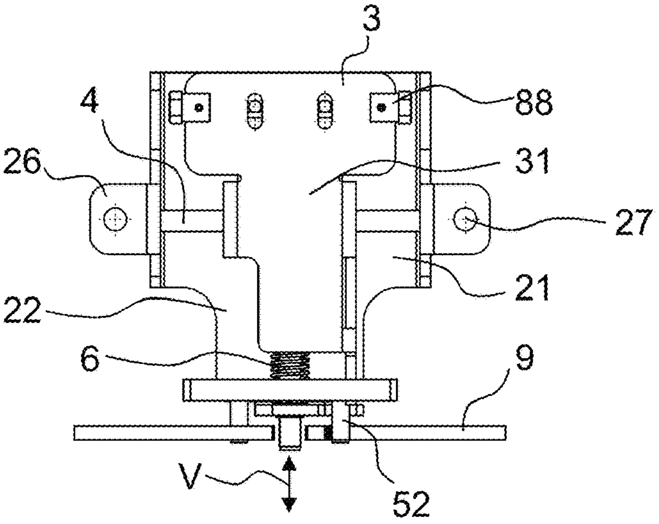
FIG. 3 shows a plan view of the locking device in FIG. 1 from above, in the locking state.

FIGS. 1 to 3 show a locking device 1 in the locked state with the door closed. The locking device 1 can be used, in particular, with a two-leaf sliding door 10, as shown in FIG. 12. The locking device 1 in this case is arranged centrally and fixedly at the upper edge of the door passage opening and is used to lock the two door leafs 11 together in the closed position, which door leafs 11 can each be slid in the closing direction (along the arrow direction in FIG. 12, i.e. perpendicular to the passage opening).

As is particularly evident from FIGS. 1, 2, and 3, the locking device 1 comprises a housing part 2, which is preferably made integrally, for example, from a metal sheet. The housing part 2 defines a interior of the locking device 1 downwards, to two opposite sides, and forwards with a holding tab 23, in which a locking element 5, in particular, a combined pressure and torsion spring 6, a sliding device, and a tilting device are accommodated.

The housing part 2 has a base plate 21 which has a flat design overall and forms a base delimiting the interior of the locking device 1. Towards two opposite sides, the base plate 21 transitions into a side plate 25 in each case. The two side plates 25 each extend vertically upwards from the lateral outer edge of the base plate 21. At the upper end of each side plate 25, a mounting tab 26 extends vertically outwards. In each of the two side plates 25, a continuous mounting hole 27 is provided, which is used for fastening the locking device 1 to a stationary element of the door or to an element anchored in a wall.

In the side plates 25, at the same height, i.e. opposite one another, a through-hole 28 is formed in each case, which is used to hold a pivot rod 4. The base plate 21 has various holes used for fastening the sliding device.

Figure 5:
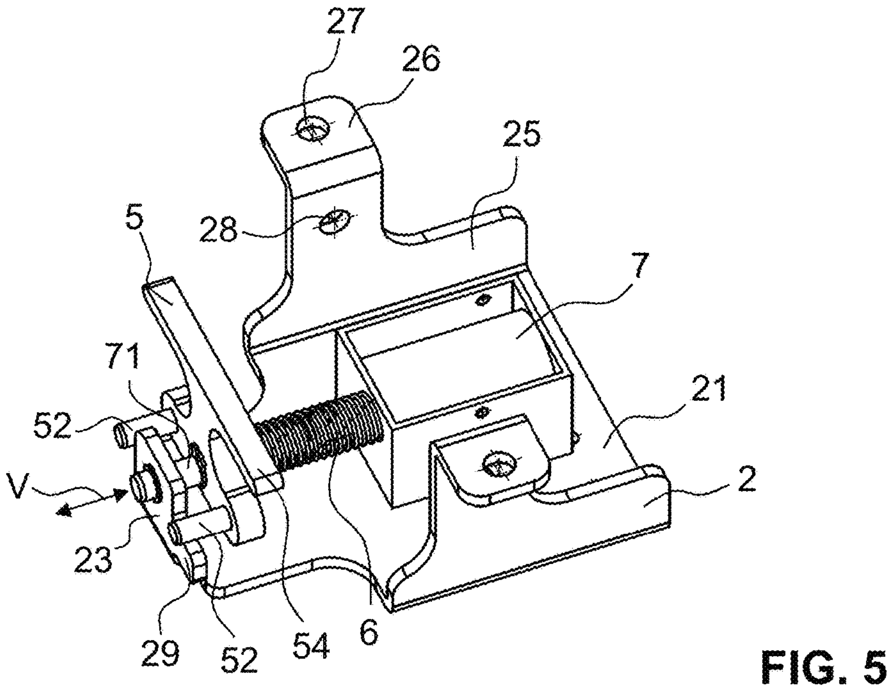
FIG. 5 shows a perspective view of a part of the locking device in FIG. 1 from diagonally in front above.
Figure 6:
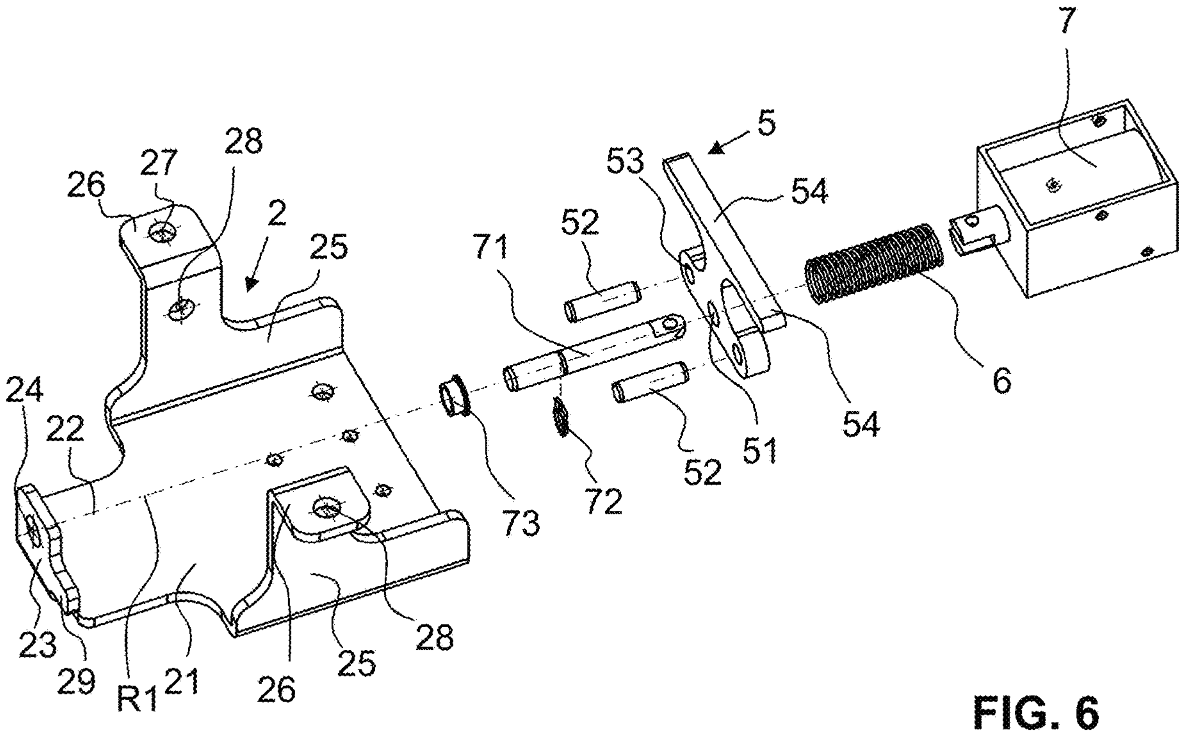
FIG. 6 shows a perspective exploded view of the part of the locking device in FIG. 5 from diagonally in front above.

Towards the front, the base plate 21 transitions into a projecting plate part 22 that is an extension of the base plate 21 beyond the laterally delimited area of the side plates 25. From the front edge of the projecting plate part 22, a holding tab 23 extends approximately half as far up as the side plates 25. In the holding tab 23, a central through-hole 24 is formed which serves to guide a push rod 71. As can be seen in FIGS. 5 and 6, the holding tab 23 extends to one side, in this case in the front view (FIG. 2) to the right, into a support element 29 projecting laterally therefrom.

Figure 4:
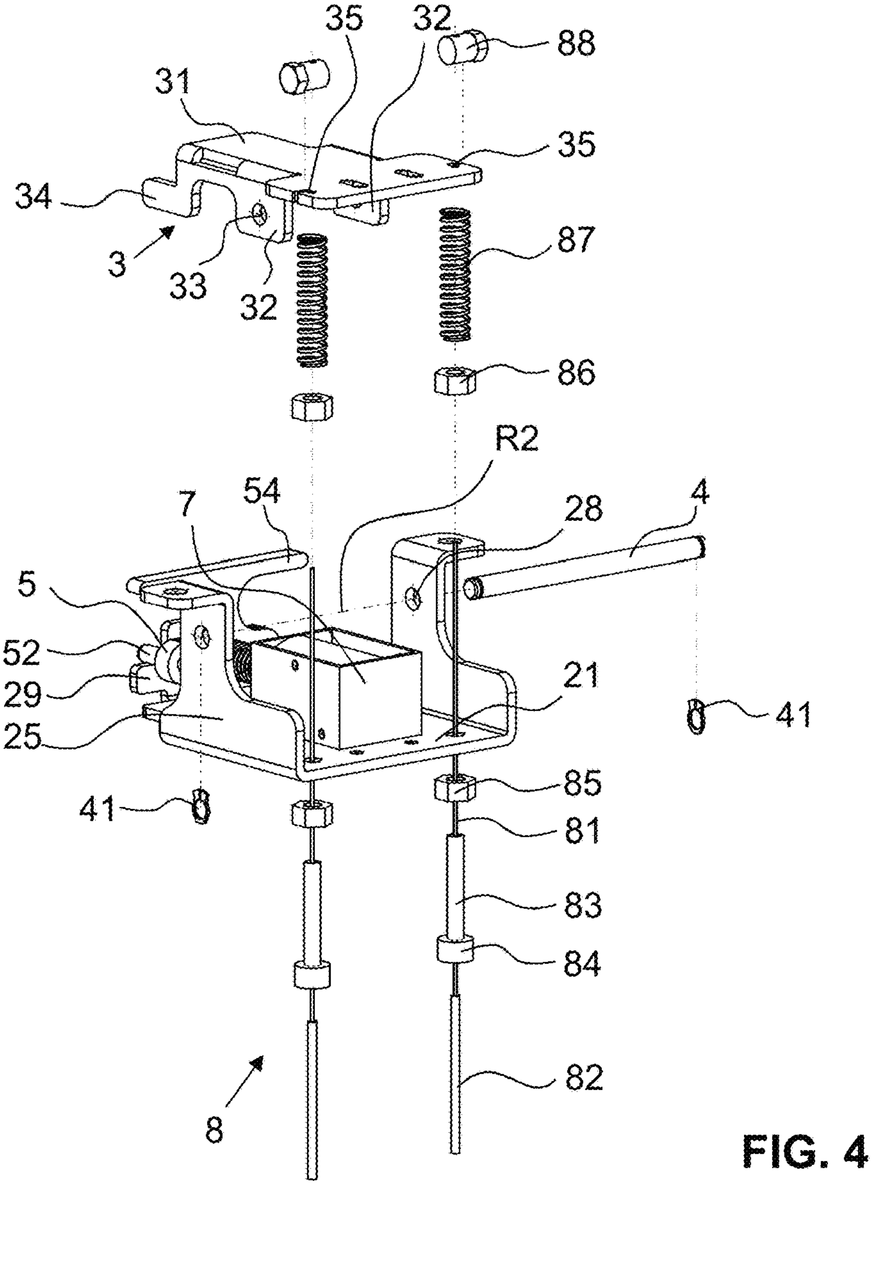
FIG. 4 shows a perspective partially exploded view of the locking device in FIG. 1 from diagonally behind above.

A sliding device which is particularly clearly visible in FIGS. 4 to 6 is mounted on the base plate 21 of the housing part 2. The sliding device comprises a solenoid 7, a push rod 71, a stop element 72, and a bearing ring 73. The solenoid 7, fastened to the base plate 21, is used to slide the push rod 71 attached to it back and forth along its longitudinal direction, i.e., along a sliding direction V. The sliding direction V is marked with a double arrow in FIGS. 3 and 5. The solenoid 7 is an electrical component known per se which, when activated, i.e. when an electrical supply is switched on, applies a linear force to the push rod 71 attached thereto, pulling the push rod 71 along its longitudinal direction, i.e. along the sliding direction V, towards the solenoid 7, against the compressive force applied by the combined pressure and torsion spring 6 to the locking element 5 and therefore also to the push rod 71. The solenoid 7 has end position magnets, which are not visible in the figures, to hold the solenoid 7 (and therefore the push rod 71 and the locking element 5) in position when this is deactivated after a movement has been performed.

In order to move the push rod 71 and the locking element 5 forwards along the sliding direction V, i.e. away from the solenoid 7, the solenoid 7 is energized with a reversed polarity voltage, causing it to apply a force to the push rod 71 and the locking element 5 in the forwards direction along the sliding direction V. The forward displacement of the locking element 5 is also supported by the restoring force of the combined pressure and torsion spring 6, so that the pulling force exerted by the end position magnet is overcome overall.

In the region of its front end, the push rod 71 extends through the through-hole 24 provided in the holding tab 23. The push rod 71 is guided laterally through it in its forward and backward movement. In order to improve the guidance, a bearing ring 73 may be arranged, as in this case, in the through-hole 24.

In a front region, but rearward to the through-hole 24, the push rod 71 has a circumferential groove, in which a stop element 72 is snapped into place.

A locking element 5 is held on the push rod 71 in such a manner that it can be tilted about the push rod 71. In other words, the locking element 5 is fastened to the push rod 71 in a manner that it is rotatable about a first rotational axis R1, which extends along the longitudinal direction of the push rod 71 and therefore along the sliding direction V. The locking element 5 is integrally formed as a whole and has a generally flat, plate-shaped configuration, with a wide lower part, a narrow connecting part, and a wide upper part. The wide upper part is formed by two actuating leafs 54 projecting laterally outwards from one another. In the wide lower part, a central through-hole 51 is formed, through which the push rod 71 extends. Laterally to the through-hole 51, a continuous bore 53 is provided on each side. In each of the bores 53, an engaging pin 52 is inserted or secured, for example, by screwing or by press fit, respectively, such that it projects forwards from the locking element 5.

Figure 7:
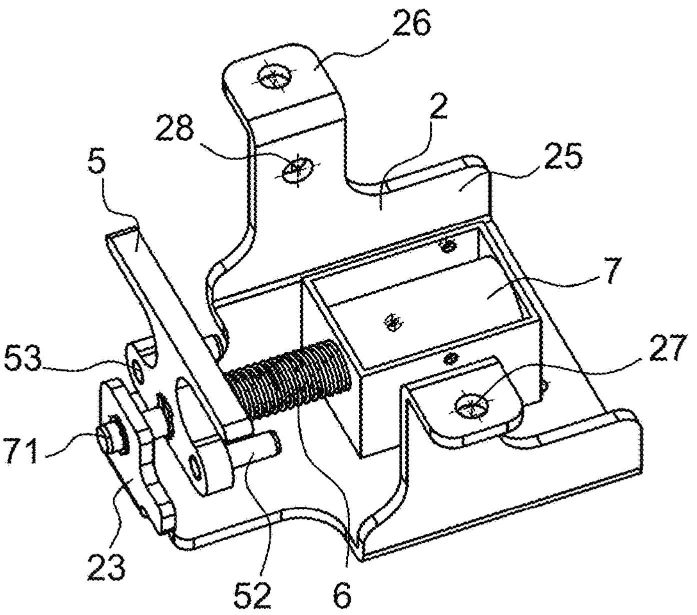
FIG. 7 shows a perspective view of the part of the locking device in FIG. 5 from diagonally in front above, with a modified locking element.
Figure 8:
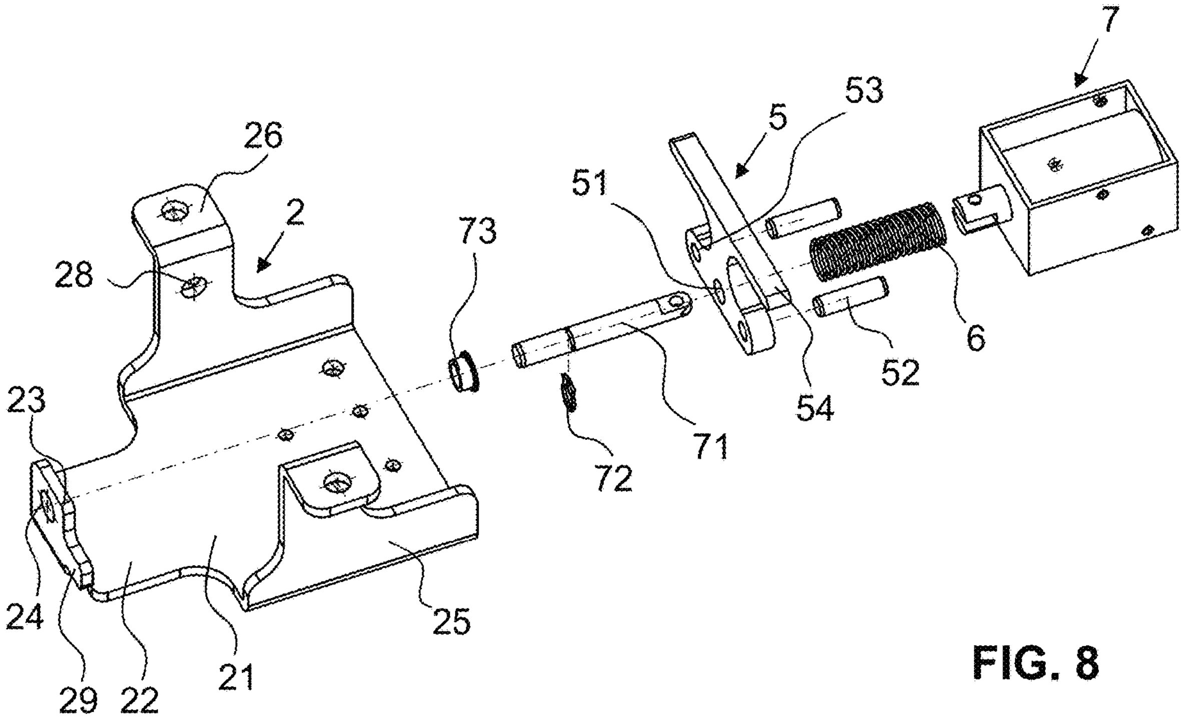
FIG. 8 shows a perspective exploded view of the part of the locking device in FIG. 7 from diagonally in front above.

Alternatively, it is also possible to attach the locking element 5 rotated by 180° to the push rod 71, so that the engaging pins 52 each project rearwards from the locking element 5 instead of forwards. This modification of the locking element 5 is shown in FIGS. 7 and 8. Instead of rotating the entire locking element 5, alternatively it would also be possible to attach the engaging pins 52 to the side opposite thereto.

The variant of attaching the engaging pins 52 to the locking element 5, which is shown in FIGS. 5 and 6, is intended for use with a sliding door 10 that is to be locked as standard in the event of a power failure. Due to the power failure, the solenoid 7 is deactivated in this case, and the locking element 5 is therefore automatically displaced forwards by the combined pressure and torsion spring 6. As a result of this, the engaging pins 52 come to rest at the height of the locking hooks 9, which engage therein when the sliding door 10 is closed, as shown in FIGS. 2 and 3. The sliding door 10 is thereby locked.

The variant in FIGS. 7 and 8, on the other hand, is intended for a sliding door 10 that is to be automatically unlocked in the event of a power failure. Here too, in the event of a power failure, the solenoid 7 is deactivated, causing the locking element 5 to be shifted forwards by the combined pressure and torsion spring 6. However, this causes the engaging pins 52 to be shifted forwards out of alignment with the locking hooks 9. As a result, the locking hooks 9 can no longer engage with the engaging pins 52, and the sliding door 10 is thereby unlocked, i.e. released.

The function of whether the sliding door 10 should be automatically locked or released by the locking device 1 in the event of a power failure can therefore be flexibly and very easily switched by rotating the locking element 5.

The push rod 71 extends partially within a combined pressure and torsion spring 6, which forms a rear stop at the housing of the solenoid 7 with its first end, and a front stop at the locking element 5 with its second end. The combined pressure and torsion spring 6 thereby applies a forward-directed pressure force to the locking element 5 along the sliding direction V. The locking element 5 is thereby pressed by the combined pressure and torsion spring 6 against the stop element 72 attached to the push rod 71.

However, the combined pressure and torsion spring 6 not only exerts pressure on the locking element 5 but also applies a torsional force to it. In the front view (FIG. 2), this torsional force is directed clockwise. To be able to exert the pressure and torsional force, the combined pressure and torsion spring 6 is attached to the solenoid 7 and the locking element 5 in a correspondingly preloaded manner. Due to the torsional force exerted by the combined pressure and torsion spring 6, the locking element 5 is rotated clockwise against the holding tab 23 until one of the engaging pins 52 rests on the support element 29 (see FIG. 2). In this position, the actuating leafs 54 of the locking element 5 each extend outwards in the horizontal direction.

The locking element 5 is primarily used, with its engaging pins 52, to lock the two door leafs 11 of the sliding door 10 (FIG. 12) in the closed state. For this purpose, a locking hook 9 which is designed to engage with one of the engaging pins 52 is attached to each door leaf 11. In this case, as shown in FIG. 2, one of the locking hooks 9 preferably has a downwards-projecting end hook and the other has an upwards-projecting end hook. In a horizontal cross-sectional view, the locking element 5, with its two engaging pins 52, forms a bracket or C-shaped element which is used to hold together the two closed door leafs 11 by allowing the locking hooks 9 attached to each door leaf 11 to engage with the locking element 5 from opposite sides, as can be seen in FIG. 3, for example. As a result of this, the two door leafs 11 can no longer be moved apart from one another and are therefore locked by the locking element 5.

As can be clearly seen in the view of FIG. 2, the locking hooks 9 each have an inclined surface 91 in the region of their end hooks. The inclined surfaces 91 serve to abut against one of the engaging pins 52 in each case when the door leafs 11 are closed and thereby to tilt the locking element 5. This can be seen particularly clearly in FIGS. 10*a* and 10*b*, in the top image in each case. By tilting the locking element 5 against the torsional force exerted by the combined pressure and torsion spring 6, the locking hooks 9 with their end hooks can be moved towards one another in a horizontal direction beyond the engaging pins 52. As soon as the end hooks have passed the engaging pins 52 and the door leafs 11 abut one another with their main closing edges in the closed position, the locking element 5 tilts back into its basic position, as shown in the top image in FIG. 10*c*. In this case, the engaging pins 52 are engaged from behind by the locking hooks 9, so that the sliding door 10 is not only closed, but also locked.

The pivot rod 4 extends through the two through-holes 28 provided in the side plates 25 and therefore in a direction perpendicular to the sliding direction V. In their respective end regions, the pivot rods 4 each have a circumferential groove, into which a mounting ring 41 is snapped in place to hold the pivot rod 4 on the housing part 2.

The pivot rod 4 is used to hold an unlocking plate 3 in such a manner that it can pivot about the pivot rod 4. The pivot rod 4 thereby forms a second rotational axis R2 around which the unlocking plate 3 can pivot. The unlocking plate 3 forms a tilting device, which is used to tilt the locking element 5.

The unlocking plate 3 is integrally formed as a whole and made of a metal sheet, for example. It has a flat main section 31, from which a fastening tab 32 extends downwards on each side via a bend. In each of the fastening tabs, an opposite through-hole 33 is formed, through which the pivot rod 4 extends. The unlocking plate 3 is thereby held pivotably on the housing part 2 via the pivot rod 4. As can be seen in FIG. 4, the flat main section 31 also transitions in its front region on the right side in the front view into an actuating element 34 via a bend, which extends vertically downwards from the main section 31. The actuating element 34 provided on only one side of the unlocking plate 3 projects slightly further forwards compared with the main section 31.

In the region behind the fastening tabs 32, the main section 31 is somewhat wider and has a right-angled slot 35 there on both sides. The right-angled slots 35 extend continuously through the unlocking plate 3 along the vertical direction and along the horizontal direction from the lateral edge of the main section 31 in each case, slightly further inwards and then vertically backwards.

In order to manually tilt the locking element 5, a Bowden cable 8 is provided which can be seen particularly clearly in FIG. 4. The Bowden cable 8 in this case is divided into two parts, i.e. with two identically designed parts. The Bowden cable 8 is used for manual unlocking of the locking device 1. For example, one part of the Bowden cable 8 can be used for manual unlocking from one side of the door, and the other part of the Bowden cable 8 can be used for manual unlocking from the other side. In another embodiment, it would be entirely possible for the Bowden cable 8 to be made in only in one piece. For the sake of simplicity, the design of the Bowden cable 8 will be explained below with the help of only one of these two parts:

The Bowden cable 8 has an inner wire 81 that runs, in principle, inside a sleeve 82 and is used to transmit tensile forces. In other embodiments, the sleeve 82 may have a pressure-resistant design, so that the Bowden cable 8 is also used, in addition, to transmit compressive forces. The sleeve 82 ends spaced apart slightly below the housing part 2. The inner wire 81 extends through a bore provided in the base plate 21 of the housing part 2 and from there along the vertical direction to the unlocking plate 3. The inner wire 81 therefore extends particularly perpendicular to the second rotational axis R2. In the region of its upper end, the inner wire 81 extends through one of the right-angled slots 35 provided in the unlocking plate 3. Immediately above the right-angled slot 35, an end clamp 88 is attached to the inner wire 81.

In the region of the bore provided in the base plate 21, the inner wire 81 extends through a threaded sleeve 82. The threaded sleeve 82 has an external thread onto which a first fastening nut 85 and a second fastening nut 86 are screwed. The two fastening nuts 85 and 86 abut the base plate 21 from opposite sides, thereby securing the threaded sleeve 82 to the housing part 2. In its lower region, the thread 83 has a radially projecting stop element 84, against which the sleeve 82 abuts downwards. In the region between the housing part 2 and the unlocking plate 3, the inner wire 81 extends longitudinally through a coil spring 87. The coil spring 87 in this case lies with its lower end against the second fastening nut 86 and with its upper end against the underside of the unlocking plate 3.

The coil spring 87 is a compression spring which exerts an upwards force on the unlocking plate 3. Due to the rotatable mounting of the unlocking plate 3 on the pivot rod 4, the actuating element 34 is thereby pressed downwards.

Figure 9A:
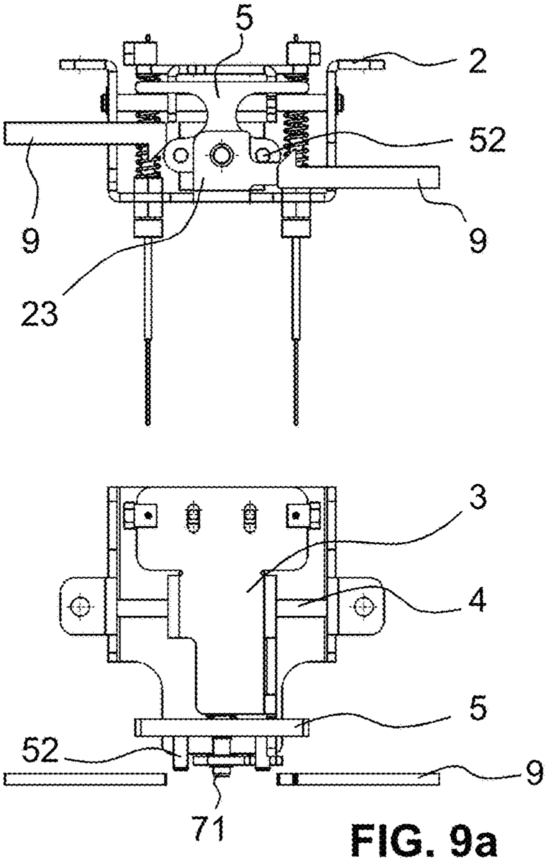
FIG. 9*a* shows a plan view of the locking device in FIG. 1 from the front, in a releasing state, with an at least partially opened door, from the front (top) and from above (bottom)
Figure 9B:
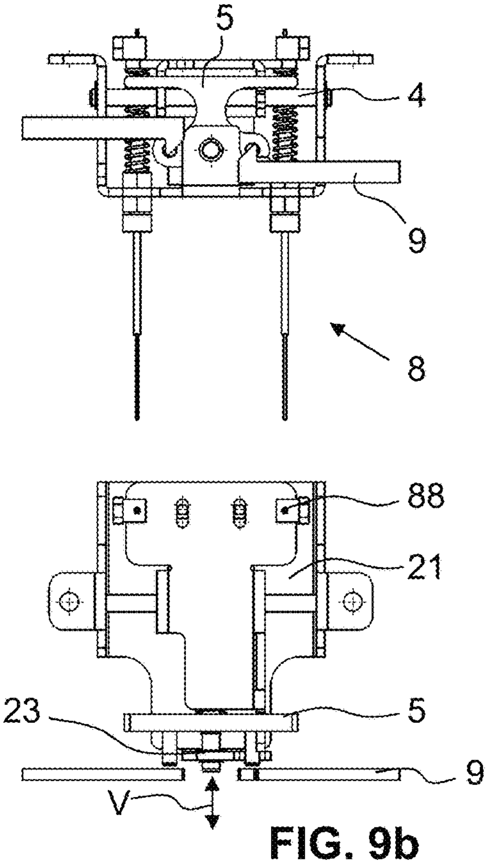
FIG. 9*b* shows a plan view of the locking device in FIG. 9*a* from the front, in the releasing state, when closing the door, from the front (top) and from above (bottom)
Figure 9C:
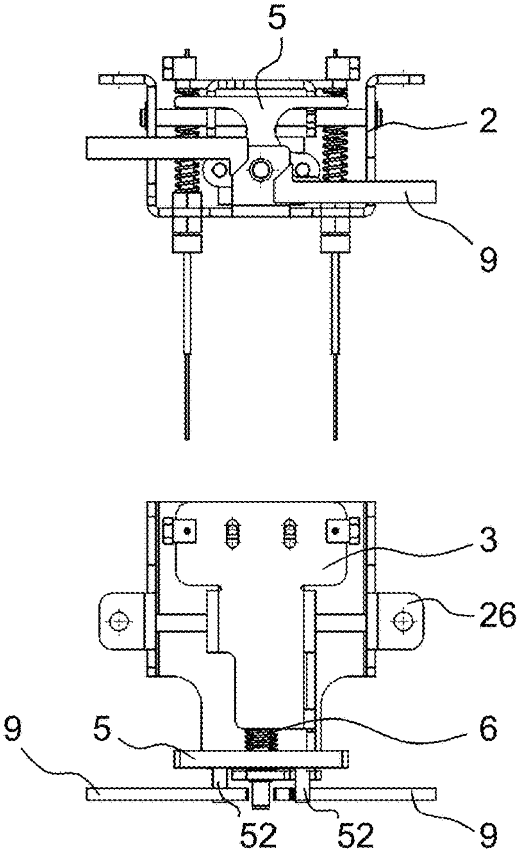
FIG. 9*c* shows a plan view of the locking device in FIG. 9*a* from the front, in the locking state, with the door closed, from the front (top) and from above (bottom)
Figure 10A:
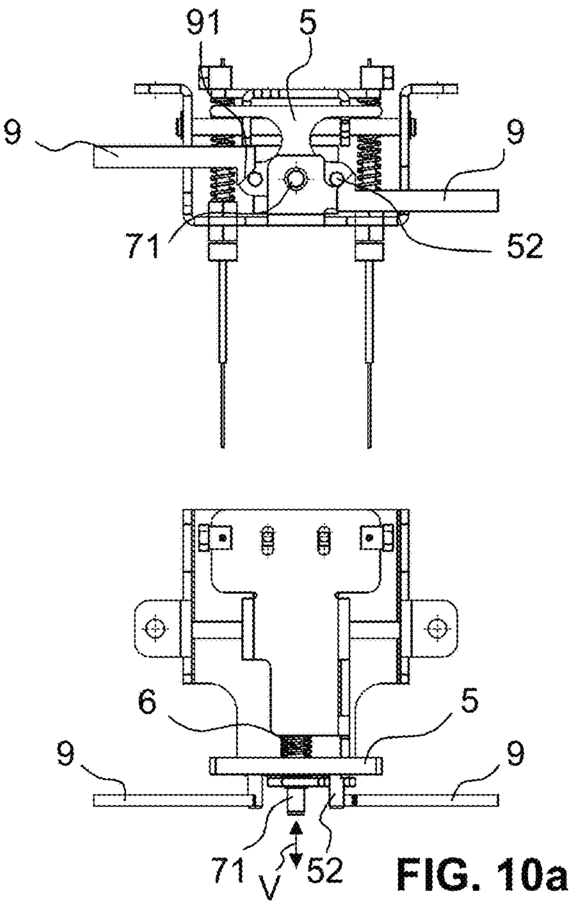
FIG. 10*a* shows a plan view of the locking device in FIG. 1 from the front, in the locking state, with an at least partially opened door, from the front (top) and from above (bottom)
Figure 10B:
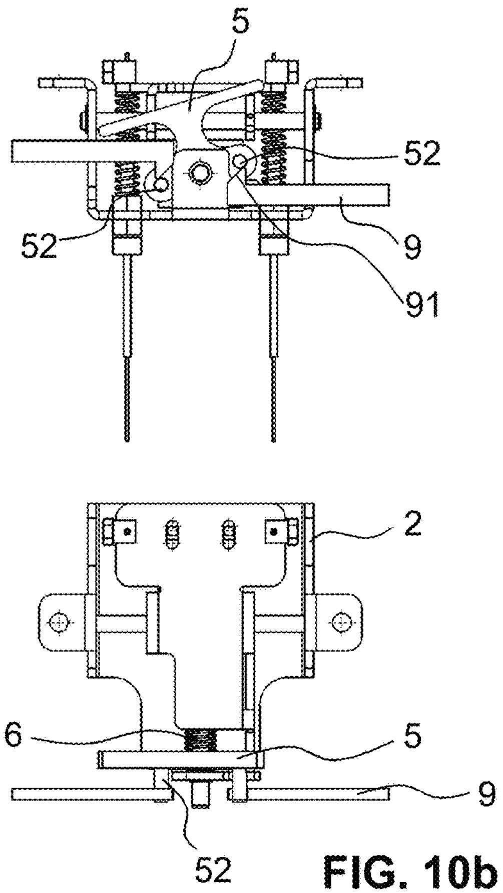
FIG. 10*b* shows a top view of the locking device in FIG. 10*a* from the front, when closing the door, from the front (top) and from above (bottom)
Figure 10C:
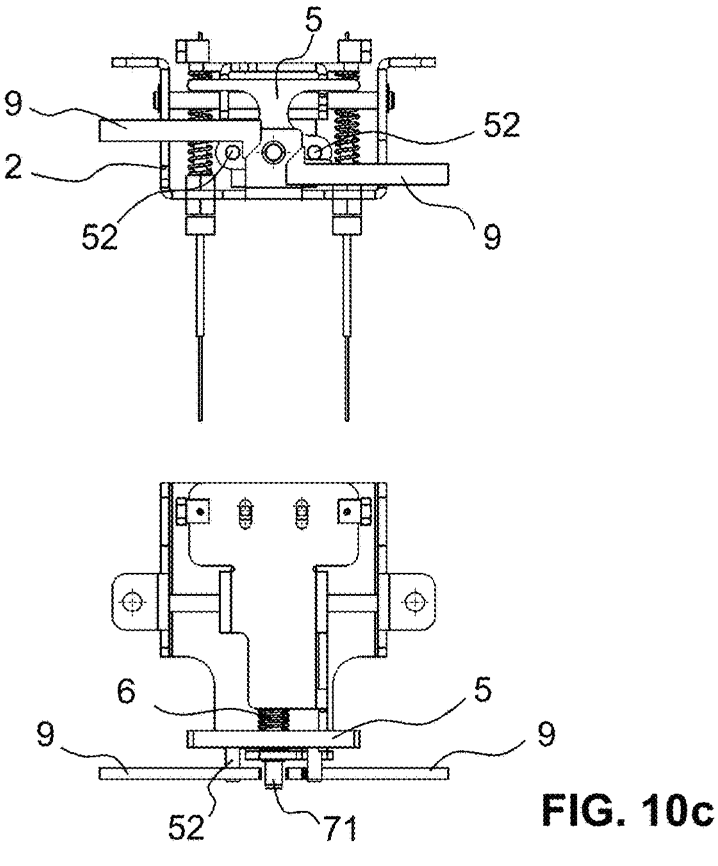
FIG. 10*c* shows a plan view of the locking device in FIG. 10*a* from the front, in the locking state, with the door closed, from the front (top) and from above (bottom)

The operation of the locking device 1 is described below with reference to FIGS. 9*a* to 9*c*, 10*a* to 10*c*, and 11*a* to 11*c*, wherein FIGS. 9*a* to 9*c* illustrate automatic locking and unlocking, FIGS. 10*a* to 10*c* illustrate automatic locking in the event of a power failure, and FIGS. 11*ab* to 11*c* illustrate manual locking and unlocking.

The situation with the sliding door 10 open and the locking device 1 released is shown in FIG. 9*a*. In order to achieve this state, the solenoid 7 has been previously activated, so that the locking element 5 is pulled towards the solenoid 7 via the push rod 71 against the pressure force exerted by the combined pressure and torsion spring 6. In the releasing state in FIG. 9*a*, the solenoid 7 is deactivated, and the locking element 5 is held in position by an end position magnet not shown in the figures. The attraction force exerted by the end position magnet on the locking element 5 therefore exceeds the pressure force exerted by the combined pressure and torsion spring 6 on the locking element 5. As can be seen in FIGS. 9*a* and 9*b* at the bottom in each case, in this position of the locking element 5 the engaging pins 52 are outside the plane with the locking hooks 9, and the door leafs 11 are therefore released. Even when closing the sliding door 10, the locking hooks 9 do not engage with the engaging pins 52 (FIG. 9*b*). However, if the sliding door 10 is to be locked when the door leafs 11 are closed the solenoid 7 is supplied with a reverse voltage, so that it exerts a forwards force on the push rod 71. In this way and by means of additional support from the combined pressure and torsion spring 6, the locking element 5 is shifted forwards, so that the engaging pins 52 come to lie in the plane of the locking hooks 9, as shown in FIG. 9*c*. Since the locking hooks 9 engage with the engaging pins 52, the door leafs 11 can no longer be moved apart from one another, and are therefore locked. Once the locking element 5 reaches the locking position shown in FIG. 9*c*, the solenoid 7 can be deactivated. The locking element 5 is then held in position by the pressure force exerted by the combined pressure and torsion spring 6 and possibly with the help of another end position magnet.

FIG. 10*a* shows the situation with the sliding door 10 open and the locking device 1 locked. The solenoid 7 is deactivated in this case, wherein the deactivation may have occurred here due to a power failure, but it could also be caused, for example, by a control system, in order to automatically lock the sliding door 10 in the evening after the close of business, for example. Since the solenoid 7 therefore exerts no force on the locking element 5, this is shifted forwards by the combined pressure and torsion spring 6, so that the engaging pins 52 are arranged in the plane of the locking hooks 9 (FIG. 10*a*, bottom). When the door leafs 11 are moved together, for example, manually or automatically by a drive (e.g. initiated by a control system), i.e. towards a position closing the door opening, the locking hooks 9 strike the engaging pins 52 with their inclined surfaces 91 from the outside. Due to the inclined surfaces 91, the engaging pins 52, as shown at the top in FIG. 10*b*, are pushed downwards or upwards, resulting in a tilting of the locking element 5 against the torsional force exerted by the combined pressure and torsion spring 6. As soon as the door leafs 11 abut one another with their main closing edges, and the locking hooks 9 with their end hooks have therefore passed the engaging pins, the locking element 5 is rotated back to its original position by the combined pressure and torsion spring 6, as shown in FIG. 10*c*. The locking hooks 9 are then engaged with the engaging pins 52, so that the sliding door 10 is prevented from being opened by the locking device 1. The door leafs 11 can then no longer be moved apart from one another and are therefore locked.

Figure 11A:
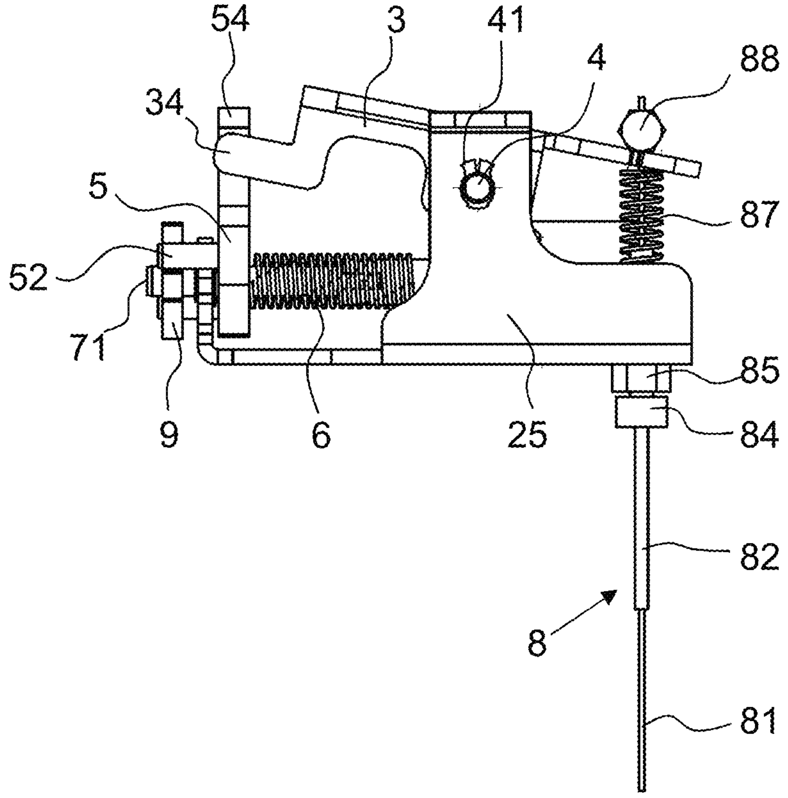
FIG. 11*a* shows a plan view of the locking device in FIG. 1, in a releasing state by manual operation, from the side.
Figure 11B:
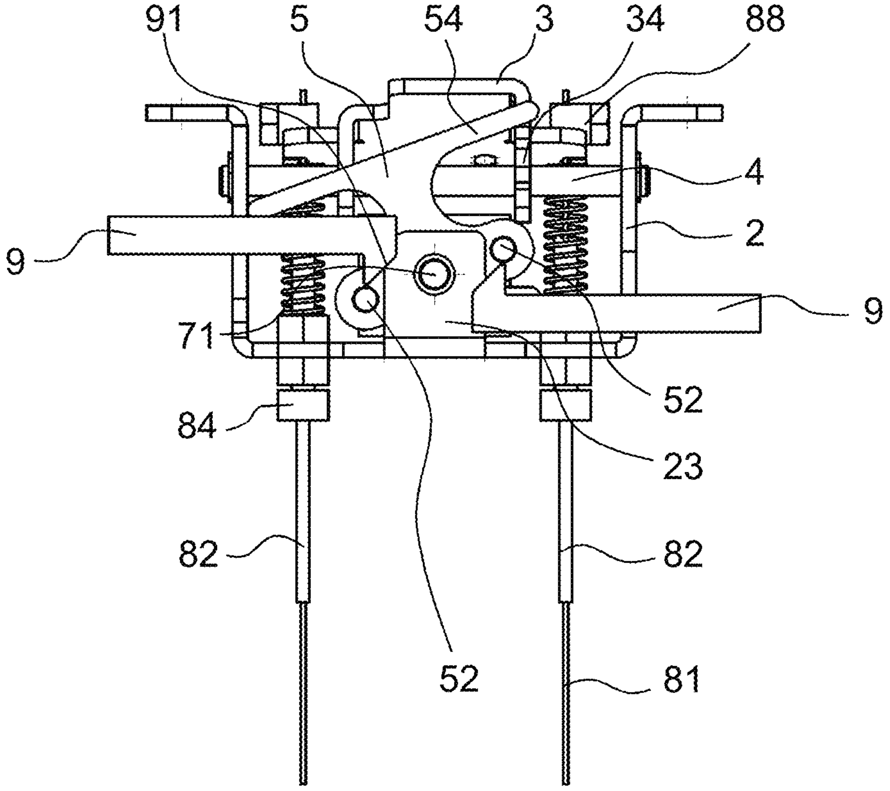
FIG. 11*b* shows a plan view of the locking device in FIG. 11*a* from the front.
Figure 11C:
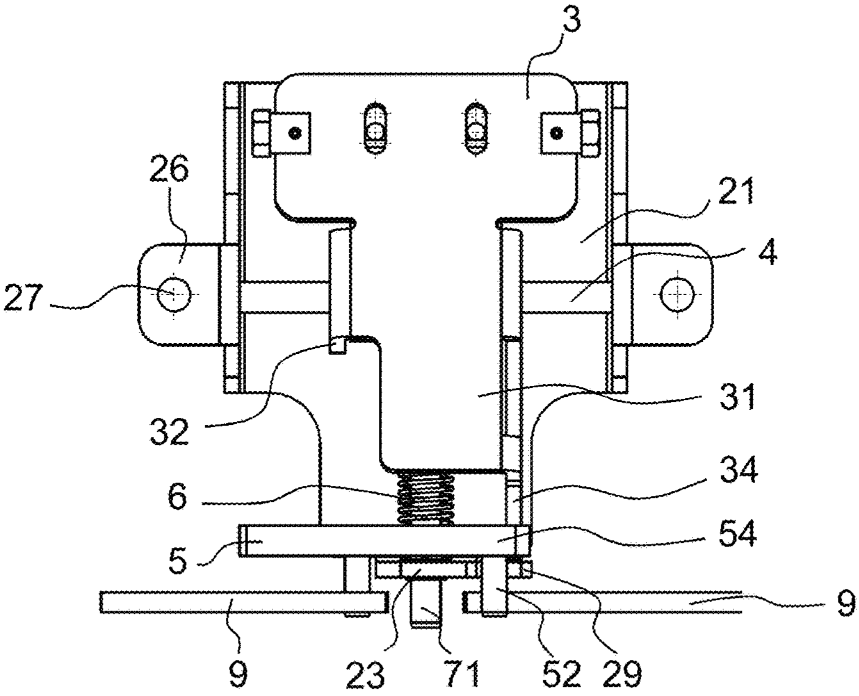
FIG. 11*c* shows a plan view of the locking device in FIG. 11*a* from above.

The manual unlocking and locking shown in FIGS. 11*a* to 11*c* can, for example, be used to unlock the locked sliding door 10 by hand in the event of an emergency or malfunction. To do this, the user manually pulls down the inner wire 81 of the Bowden cable 8. As a result, the rear part of the unlocking plate 3 is pulled along against the spring force exerted by the coil springs 88 due to the end clamp 88, so that the unlocking plate 3, as shown in FIG. 11*a*, is pivoted around the pivot rod 4. By pivoting the unlocking plate 3, the actuating element 34 thereof moves upwards. The actuating element 34 strikes against the underside of one of the two actuating leafs 54 of the locking element 5 during this and lifts it, causing the locking element 5 to tilt against the torsional force exerted by the pressure and torsion spring 6 around the push rod 71 (FIGS. 11*a* and 11*b*). Due to the tilting, the engaging pins 52 disengage from the locking hooks 9, so that the door leafs 11 are released and the sliding door 10 can be opened. Once the Bowden cable 8 is released by the user, the unlocking plate 3 pivots back to its original position due to the pressure exerted by the coil springs 87. Due to the torsional force exerted by the pressure and torsion spring 6, the locking element 5 is thereby also rotated back into its original position. If the sliding door 10 is to be closed again and locked after opening, this can be done by simply pushing the door leafs 11 together by hand. The locking hooks 9 then strike against the locking element 5, as shown in FIGS. 10*a* to 10*c*, causing it to tilt and finally engage with the engaging pins 52 again. It is therefore possible, even in the event of a power failure, to manually unlock and lock the sliding door 10.

Another, but also inventive embodiment of a locking device 1 is shown in FIGS. 13 and 14. In contrast to the embodiment of FIGS. 1 to 11*c*, the locking device 1 in FIGS. 13 and 14 has a locking element 5 in which the engaging pins 52 are integrally connected to the remaining part of the locking element 5, i.e. the locking element 5 is integrally formed as a whole. Otherwise, the embodiment in FIGS. 13 and 14, in terms of its operation, corresponds to that in FIGS. 1 to 11*c*, although certain elements and, in particular, parts thereof may differ in terms of their dimensions from those of the embodiment in FIGS. 1 to 11*c*. The locking device 1 in FIGS. 13 and 14 is also suitable for use with a sliding door 10, as shown in FIG. 12.

The above invention is, of course, not limited to the present embodiments and a plurality of modifications is possible. For example, it would be conceivable that instead of a solenoid, another drive, such as a hydraulic or pneumatic drive, or an electric rotary drive, for example, could be provided to move the push rod 71. In other embodiments, the shifting device need not even be a technically driven device, but it could also be manually operable. Similarly, it would be conceivable for an electrically controlled drive to be provided instead of the Bowden cable 8, for example. The roles of manual and technically driven operation for locking and unlocking could therefore also be reversed. It would also be possible to provide a locking device according to the invention in which both the shifting and tilting of the locking element are driven electrically or purely manually by means of muscle power. The manner in which the locking element is formed and held in the housing part may also be completely different in other embodiments. A plurality of further modifications is possible.

The invention claimed is:

1. A locking device for a door, with at least one door leaf, comprising a housing part, a locking element held by the housing part, which is configured to lock and unlock the at least one door leaf in a closed or open position, wherein the locking element is both slidable relative to the housing part along a sliding direction and tiltable about a rotational axis to allow locking and unlocking of the at least one door leaf alternatively, both by means of sliding and also by means of tilting of the locking element, and wherein the locking element comprises an engaging element which extends parallel to the sliding direction and which is configured to engage a locking hook attached to the at least one door leaf when locking.

2. The locking device as claimed in claim 1, also comprising a compression spring and a sliding device, in order to slide the locking element against the compressive force of the compression spring along the sliding direction.

3. The locking device as claimed in claim 2, wherein the sliding device has an activated state, in which the sliding device holds the locking element in a releasing state or in a locking state.

4. The locking device as claimed in claim 1, also comprising a torsion spring and a tilting device, in order to tilt the locking element against the torsional force of the torsion spring about the rotational axis.

5. The locking device as claimed in claim 4, wherein the tilting device includes an actuating element that is pivotable about a second rotational axis that extends perpendicular to the first rotational axis, about which the locking element is tiltable.

6. The locking device as claimed in claim 1, also comprising a combined compression and torsion spring that is configured to apply both a compressive force along the sliding direction and a torsional force about the rotational axis to the locking element.

7. The locking device as claimed in claim 1, also comprising one or more holding elements, in order to hold the locking element in a releasing state and/or in a locking state.

8. The locking device as claimed in claim 1, wherein the locking element is slidable automatically by means of a sliding device and manually tiltable by a user, or is tiltable automatically by means of a tilting device and manually slidable by a user.

9. The locking device as claimed in claim 8, wherein at least one Bowden cable is provided, in order to manually tilt or slide the locking element.

10. The locking device as claimed in claim 1, wherein the engaging element is configured to be selectively arranged on the locking element in such a manner that the engaging element extends outwards from either the front or the back of the locking element with respect to the sliding direction.

11. The locking device as claimed in claim 1, wherein the locking device has a compact design as a whole.

12. The locking device as claimed in claim 1, wherein the locking device is configured to lock a sliding door.

13. The locking device as claimed in claim 2, wherein the sliding device includes a solenoid.

14. The locking device as claimed in claim 7, wherein the one or more holding elements are in the form of one or more end position magnets.

15. The locking device as claimed in claim 1, wherein the one or more engaging elements are in the form of one or more engaging pins.

16. The locking device as claimed in claim 1, comprising a second door leaf and wherein the locking element comprises a second engaging element which extends parallel to the sliding direction and which is configured to engage a second locking hook attached to the second door leaf when locking the sliding device.

17. A door with at least one door leaf and a locking device to lock the at least one door leaf in a closed or open position, the locking device comprising a housing part, a locking element held by the housing part, which is configured to lock and unlock the at least one door leaf in the closed or open position, wherein the locking element is both slidable relative to the housing part along a sliding direction and tiltable about a rotational axis to allow locking and unlocking of the at least one door leaf alternatively, both by means of sliding and also by means of tilting of the locking element, and wherein the locking element comprises an engaging element which extends parallel to the sliding direction and which is configured to engage a locking hook attached to the at least one door leaf when locking.

18. The door as claimed in claim 17, wherein a locking hook is attached to each of the one or more door leafs, which locking hook is designed to engage the locking element in a direction perpendicular to the sliding direction.

19. The door as claimed in claim 18, wherein the locking hook(s) each has/have an inclined surface that is configured to abut against the locking element during closing or opening of the respective door leaf, in such a manner that it is tilted.

20. The door as claimed in claim 17, wherein the door is a sliding door.

21. The door as claimed in claim 17, comprising a second door leaf and wherein the locking element comprises a second engaging element which extends parallel to the sliding direction and which is configured to engage a second locking hook attached to the second door leaf when locking the sliding device.

* * * * *